(12) United States Patent
Radzik

(10) Patent No.: US 6,533,333 B1
(45) Date of Patent: Mar. 18, 2003

(54) HINGED MECHANICAL COUPLINGS WITH INTERFITTING ENDS

(75) Inventor: Joseph G. Radzik, Easton, PA (US)

(73) Assignee: Central Sprinkler Corporation, Lansdale, PA (US)

( * ) Notice: Subject to any disclaimer, the term of this patent is extended or adjusted under 35 U.S.C. 154(b) by 16 days.

(21) Appl. No.: 09/696,885

(22) Filed: Oct. 26, 2000

Related U.S. Application Data

(63) Continuation-in-part of application No. 09/138,431, filed on Aug. 24, 1998, now Pat. No. 6,139,069.
(51) Int. Cl.⁷ .............................................. F16L 23/08
(52) U.S. Cl. ........................ 285/367; 285/366; 285/411; 285/415
(58) Field of Search .................. 285/409, 410, 285/420, 363–367, 112, 411, 415, 373; 248/68.1, 74.3

(56) References Cited

U.S. PATENT DOCUMENTS

| | | | | |
|---|---|---|---|---|
| 2,225,208 A | * | 12/1940 | Crickmer | 285/104 |
| 2,449,795 A | * | 9/1948 | Stillwagon | 285/104 |
| 4,391,458 A | * | 7/1983 | Blakeley | 285/112 |
| 4,611,839 A | * | 9/1986 | Rung et al. | 285/367 |
| 4,896,902 A | * | 1/1990 | Weston | 285/93 |
| 5,058,931 A | * | 10/1991 | Bowsher | 285/112 |
| 5,246,257 A | * | 9/1993 | Kojima et al. | 285/112 |
| 5,911,446 A | * | 6/1999 | McLennan | 285/104 |

OTHER PUBLICATIONS

Mech–Line Fig. 401 & 402 Join–T catalog sheet, 2 pp., Nov., 1992, Sprink, Inc., Fullerton, CA.
IPS Carbon Steel Pipe Grooved Couplings 06.09 Stype 70 Snap–Joint® Coupling catalog sheet, 2 pp., Oct., 1996, Victaulic Co. of America, Easton, PA.
Quikhinge Style 007 Flexible For Grooved End Pipes catalog sheet and title page, 2 pp., Jul., 1997, Modgal Ltd., Rosh Pina, Israel.
Grinnell Gruvlok Data Sheet 4 Hingelok Coupling Fig. 7003 catalog sheet, 2 pp., Apr., 1993, Grinnell Supply Sales Co., Cranston, RI.

* cited by examiner

*Primary Examiner*—Lynne H. Browne
*Assistant Examiner*—Michael P. Ferguson
(74) *Attorney, Agent, or Firm*—Akin, Gump, Strauss, Hauer & Feld, L.L.P.

(57) ABSTRACT

Hinged mechanical couplings with interfitting ends include at least a pair of coupling segments each having: an elongated arcuate body with first and second opposing ends; a generally concave surface with central channel extending between the ends; a longitudinal central plane extending through the ends; a tongue and a recess located side-by-side on each end, the tongue being generally on an opposite side of the longitudinal central plane from the recess, each recess being slightly larger than the tongue to receive the tongue of the other coupling segment and form a tongue-recess interfit when the coupling segments are coupled together; a fastener pad protruding from the first end; and a pair of axially spaced-apart extensions protruding generally radially outwardly from the second end, one extension located on one side of the central longitudinal plane and immediately adjoining a space on an opposing side of the plane defined between the two extensions, the extensions being pivotally connected together to hinge the two segments. For securing grooved pipe elements, flanges are provided flanking the axial edges of the central channel and teeth can be provided adjoining the flanges to grip the pipe elements. Sloping faces on the fastener pads can be provided to guide a fastener end into engagement with an open slot in the fastener pad between the faces. Identical or nearly identical segments can be hinged together to form a coupling.

26 Claims, 3 Drawing Sheets

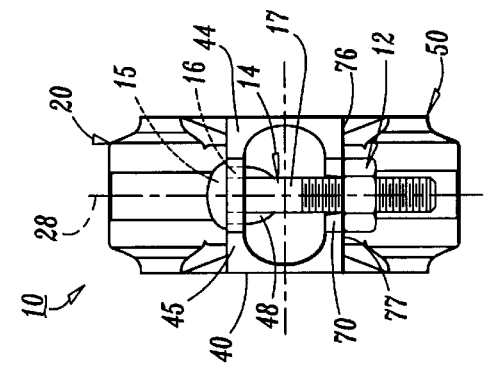
FIG. 3
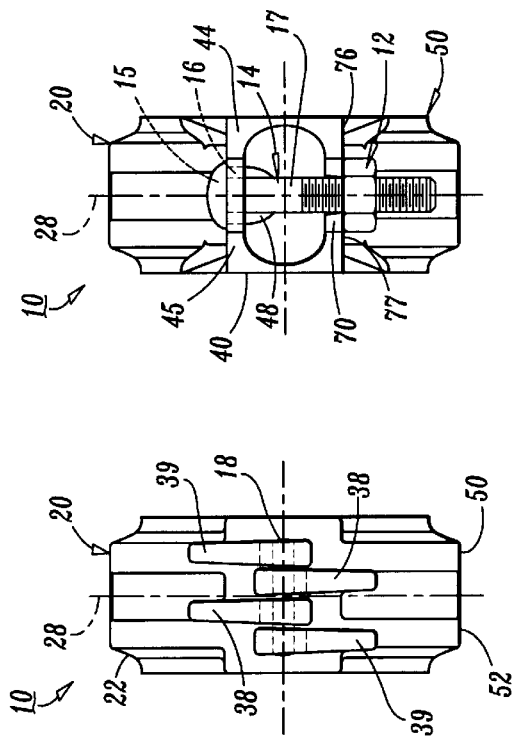
FIG. 2
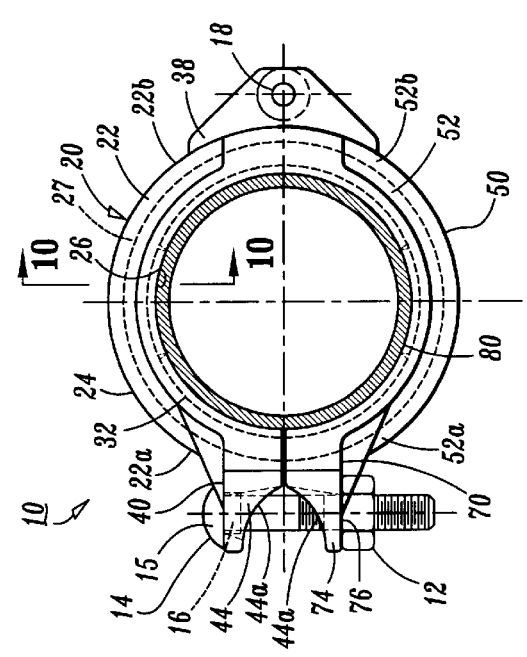
FIG. 1
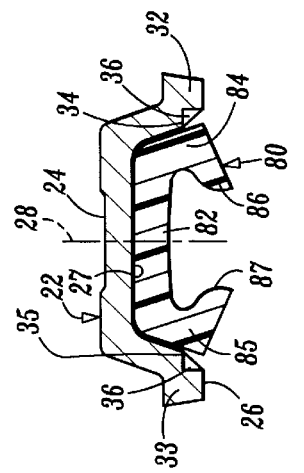
FIG. 10
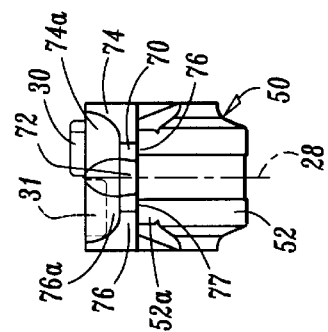
FIG. 9
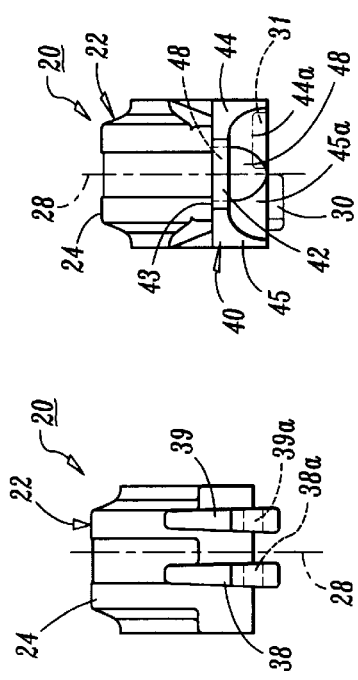
FIG. 6
FIG. 5

HINGED MECHANICAL COUPLINGS WITH INTERFITTING ENDS

CROSS-REFERENCE TO RELATED APPLICATIONS

This application is a continuation-in-part of application Ser. No. 09/138,431 filed Aug. 24,1998 now U.S. Pat. No. 6,139,069.

BACKGROUND OF THE INVENTION

This invention relates generally to a mechanical coupling with interfitting ends for use in coupling the ends of two abutting pipe elements.

It is well known in the art to use segmented couplings which comprise two or more coupling segments to extend over the ends of abutting pipe elements and to compress the coupling segments into a sealing relation with the external circumference of the aforementioned pipe elements to form a leak-proof bond between coupling and the two elements. The term "pipe element" is used in a broad sense to encompass any tubular element that might be conventionally coupled with another tubular pipe element with a coupling. "Pipe elements" include but are not limited to conventional lengths of pipe, fittings of all types, valves and all other tubular elements that might be interconnected with such elements in a piping system.

It is also well known in the art to provide an interfitting relationship between the ends of the coupling segments in order to provide a more positive coupling force between the coupling segments. This interfitting relationship is generally accomplished by a tongue and recess arrangement. Generally, each coupling segment has a tongue centered on one end and a recess centered on the other end. Two identical coupling segments are intended to be mated together with the tongue of a first segment fitting into the recess of a second segment and the tongue of the second segment fitting into the recess of the first segment. The interfit of the tongue and recess provides proper alignment of the coupling segments with respect to each other and also provides a stronger connection between the coupling segments.

It is also known in the art to provide a hinged mechanical coupling formed by two semicircular segments, which are permanently hinged together at one of their two ends. If the remaining free ends of the two segments are not left plain (without inter-engaging structures), one is often provided with a centered protruding tongue while the free end of the remaining segment is provided with a mating recess. This construction requires the provision of two distinctly different segments which increases manufacturing and inventory costs. Also, it is possible to incorrectly assemble two segments with tongues or two segments with recesses, which will have to be scrapped or taken apart for proper assembly.

BRIEF SUMMARY OF THE INVENTION

In one aspect, the invention is a coupling segment comprising: an elongated arcuate body having opposing first and second ends; a generally concave surface extending between the first end and the second end; a longitudinal central plane extending from the first end to the second end; a tongue and a recess located side-by-side at the first end, the tongue being generally on an opposite side of the longitudinal central plane from the recess, the recess being slightly larger than the tongue to receive a substantially identical tongue of another coupling segment and form a tongue-recess interfit when the coupling segment is coupled together with the other coupling segment; and at least a first extension of the arcuate body protruding generally radially outwardly from the second end, located on one side of the longitudinal central plane and immediately adjoining a space on an opposing side of the plane, the at least first extension having a bore extending therethrough at least substantially perpendicular to the longitudinal central plane.

In another aspect, the invention is a segmented pipe coupling comprising a first coupling segment and a second coupling segment coupled with the first coupling segment, the first coupling segment being the coupling segment above and the second coupling segment including: an elongate arcuate body having opposing first and second ends, the longitudinal central plane extending from the first end to the second end; a generally concave surface extending between the first end and the second end; a tongue and a recess located side-by-side at the first end, the tongue being genera central plane from the recess, the recess being slightly larger than the tongue of the first coupling segment and receiving the tongue of the first coupling segment and the tongue being slightly smaller than the recess of the coupling segment of claim 1 and received in the recess of the first coupling segment to form a tongue-recess interfit between the second coupling segment and the first coupling segment; at least one extension of the arcuate body protruding generally radially outwardly from the second end, located on one side of the central longitudinal plane and immediately adjoining the extension on the second end of the first coupling segment, the at least one extension having a bore extending therethrough at least substantially perpendicular to the longitudinal central plane and coaxial with the bore of the first coupling segment; and a pivot pin through the coaxial bores hinged coupling together the second end of the second coupling segment with the second end of the first coupling segment.

In yet another aspect, the invention is a hinged pipe coupling comprising a pair of coupling segments, each of the pair of coupling segments including at least: an elongated arcuate body having opposing first and second ends; a generally concave surface extending between the first end and the second end; a longitudinal central plane extending from the first end to the second end; and a tongue and a recess located side-by-side at the first end, the tongue being generally on an opposite side of the longitudinal central plane from the recess, the recess being slightly larger than the tongue to receive a substantially identical tongue of the other coupling segment and form a tongue-recess interfit when the coupling segment is coupled together with the other coupling segment; the pair of coupling segments being pivotally coupled to one another at the second end of each segment.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 1 is a side elevation of a first embodiment mechanical coupling with interfitting ends of the present invention;

FIG. 2 is an orthogonal view of the hinged end of the coupling of FIG. 1;

FIG. 3 is a an orthogonal view of the bolted end of the coupling of FIG. 1;

FIG. 5 is a hinge end view of the exterior of the first segment of FIG. 4;

FIG. 6 is a free or bolt end view of the exterior of the first segment of FIG. 4;

FIG. 9 is a free or bold end view of the exterior of the second segment of FIG. 8;

FIG. 10 is a localized cross section view of the hinged coupling of FIG. 1 taken along lines 10—10 of FIG .1;

DETAILED DESCRIPTION OF THE INVENTION

Figure 4:
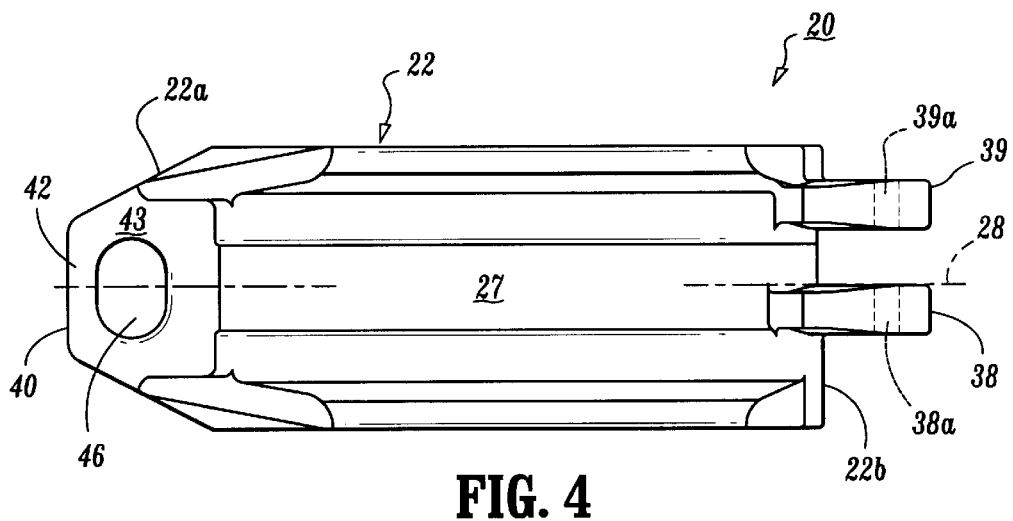
FIG. 4 is a plan view showing an exterior or outer side of the first of the two segments of the hinged coupling of FIG. 1.

In the drawings, like numerals are used to indicate like elements throughout. application Ser. No. 09/138,431 filed Aug. 24, 1998, is hereby incorporated herein by reference as if fully set forth.

FIGS. 1–3 depicted a hinged, segmented, mechanical pipe coupling of the present invention indicated at 10. As can be seen, the coupling 10 is formed by a plurality, specifically a pair, of substantially identical arcuate coupling segments 20 and 50 and an annular seal 80. Each arcuate segment 20, 50 has an elongated arcuate body 22, 52, respectively, each with a pair of opposing longitudinal ends 22a, 22b and 52a, 52b, respectively. The arcuate segments 20, 50 are preferably permanently pivotally joined together at one pair of adjoining ends 22b, 52b by a pivot pin 18 and are preferably releasably joined together at a remaining, opposite pair of adjoining ends 22a, 52a by a mechanical fastener, preferably one formed by a nut 12 and bolt 14.

FIGS. 4–7 show a first embodiment coupling segment 20 in accordance with the present invention. The body 22 has a generally convex cylindrical outer surface 24 and an opposite, generally concave inside surface 26. Both surfaces 24, 26 are located and extend between first and second ends 22a, 22b, and are generally centered with respect to a longitudinal central plane 28, which extends-through the body 22 from the first end 22a to the second end 22b parallel to the plane of FIG. 1 and perpendicular to the planes of FIGS. 4–7. A tongue 30 and a recess 31 are located side by side on first end 20a. The tongue 30 is generally 40 on an opposite side of the longitudinal central plane 28 from the recess 31. The recess 31 is slightly larger than the tongue 30 to receive an identical tongue 30 of an identical element 20 or a substantially identical coupling segment including, but not limited to coupling 50 and form a tongue-and-recess interfit when the coupling segment 20 is coupled together with such other segment. It is understood that the shape of the tongue 30 and the shape of the recess 31 can be L5 any shape such that the tongue 30 fits within the recess 31.

Figure 7:
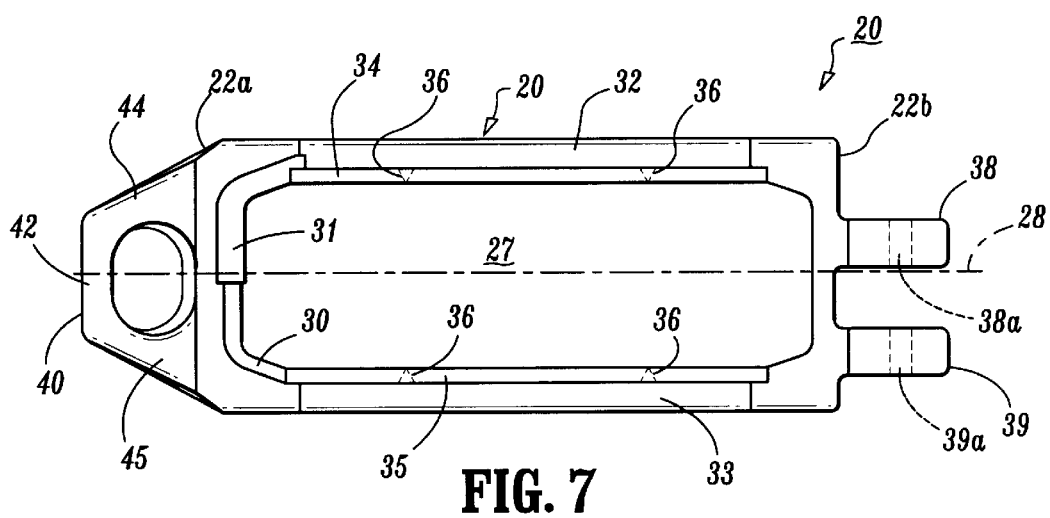
FIG. 7 is a plan view of the interior or bottom side of the first segment of FIG. 4.

Referring to FIG. 7, a longitudinal inner channel 27 extends along the concave surface 26 from first end 22a to second end 22b. The longitudinal inner channel 27 is designed to receive the annular seal 80, which spans the ends of the two pipe elements which are being joined together in a sealing relationship by the coupling 10. A pair of mirror image, radially inwardly and axially outwardly extending annular flanges 32, 33 are preferably provided flanking the longitudinal inner channel 27 along axial side edges of the channel 27 where the segment 20 is designed to engage a groove provided at the end of each of the two pipes elements joined together by the coupling 10. The flanges 32, 33 preferably are separated from the longitudinal inner channel 27 by a pair of opposing, mirror image, recessed shoulders 34, 35, respectively on each axial side of the channel 27 between the channel 27 and the adjoining flanges 32, 33. Suggestedly, one or more pipe element gripping teeth 36 are provided on each shoulder extending radially and axially inwardly to engage with the end of the pipe element adjoining the groove of that element that is engaged with flange 32 or 33.

The first end 22a of arcuate body 22 has a generally radially outwardly extending protrusion 40, which is integral with the body 22 and is configured to cooperate with the fastener (nut/bolt combination 12, 14) to releasably secure the free end 22a of segment 20 with that of segment 50 (or a similar segment). Preferably protrusion 40 is generally U-shaped (inverted in FIG. 6) and otherwise configured to define a bolt pad. The base of the U defines a transverse bolt support flange 42 preferably having an "upper" or "outer" surface 43 sufficiently flat to uniformly support the head 15 of bolt 14. The arms of the U define defined by side-by-side, spaced apart sloping flanges 44, 45 with "inner" or "lower" sloping surfaces 44a, 45a, respectively. The flanges 44, 45 and their sloping surfaces are preferably symmetric with respect to the longitudinal central plane 28. A closed perimeter fastener opening 46 extends by through the transverse flange 42 and into a slot 48 separating the sloping flanges 44, 45 for capturing bolt 14. Opening 46 may be generally oval as indicated to receive a similarly generally oval inner shoulder 16 that can be provided on bolt 14 to prevent the bolt from rotating in the opening 46 when nut 12 is tightened or loosened.

Referring to FIGS. 2, 4, 5 and 7, the segment body 22 includes at least one extension 38 protruding generally radially outwardly from the second end 22b. The extension 38 is located immediately adjoining one side of the longitudinal central plane 28 opposing a space on an opposite, remaining side of the plane 28, which is preferably at least as wide in an axial direction of the segment 20 as is the width of extension 38. Preferably the space is defined between extension 38 and a second, at least substantially identical extension 39, which also protrudes generally radially outwardly from the second end 22b generally parallel to extension 38. Each extension 38, 39 is provided with an axially extending bore 38a, 39a, respectively (in phantom), which are concentric to one another. Bores 38a, 39a convert the extensions 38, 39 into a pair of spaced apart hinge knuckles or barrels.

Figure 8:
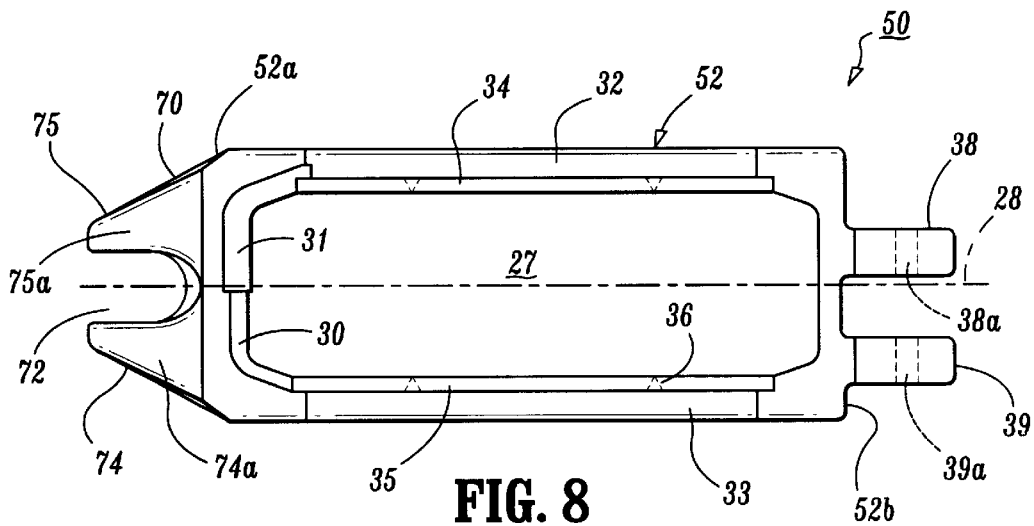
FIG. 8 is a plan view of the interior side of the second remaining one of the two segments of the hinged coupling of FIG. 1.

Referring to the previously discussed figures and FIGS. 8 and 9, the second segment 50 is preferably identical to the first segment 20 except for the shape of the protrusion 70 at its first end 52a of its body 52 defining-the bolt pad of that segment. Protrusion 70 is preferably split by a slot 72 to define a forked pair of side-by-side spaced apart, mirror image flanges 74, 75, each with an "outer", "lower" surface 76, 77, respectively which is preferably 40 sufficiently flat to uniformly support and retain nut 12, an "inner", "upper" sloping surface 74a, 75a, respectively, facing the other, first segment 20. Slot 72 is just wider than the width of the shaft 17 of bolt 14 and therefore narrower than slot 48 to assist in centering bolt 14 in the slots 48, 72.

The coupling segments 20, 50 preferably are manufactured from ductile iron, but 83 other materials generally used for manufacturing pipe couplings are acceptable. Suggestedly, the bores 38a, 39a provided in the protrusions 38, 39 differ slightly in diameter from those provided in the protrusions of the second segment 50 so that a solid pin 18 slightly larger in diameter than the smaller set of bores can be driven through the aligned bores of both segments and be frictionally gripped by the smaller set of bores. The segment 20 or 50 with the larger bores would rotate on the pin 18 with respect to the pin and the other segment.

FIG. 10 shows a cross section of the first segment 20 and the seal 80. The seal 80 suggestedly is formed by a generally cylindrical central band 82 with a pair of axially outwardly flared flanges 84, 85 extending generally radially inwardly from the outer axial edges of the band 82. The band 82 and flanges 84, 85 are configured to be snuggly received in the longitudinal inner channel 27. A pair of wings 86, 87 are further suggestedly provided extending generally radially and axially inwardly from the innermost ends of the flanges 84, 85. Extreme radial inner ends of wings 86, 87 define an inner diameter of the seal which is distinctly smaller than the outer diameters of the grooved pipe elements which are mated together with the coupling 10 so as to snuggly fit over and seal against the inner ends of such pipe elements. However, the flanges 84, 85 and wings 86, 87 can be compressed down into the longitudinal inner channel 27 to permit the edges of the material of the pipe element to be gripped by the teeth 36 along the recessed shoulders 34, 35 to prevent rotation of the coupled ends of the coupled pipe elements with respect to the coupling 10 or each other.

The annular seal 80 is suggestedly made of a resilient elastomer material appropriate for the end use of the coupling. Resilient seals like seal 80 are well known in the art. The seal 80 is preferably molded in one continuous piece but could be extruded and its ends bonded together to form the ring shape.

Figure 11:
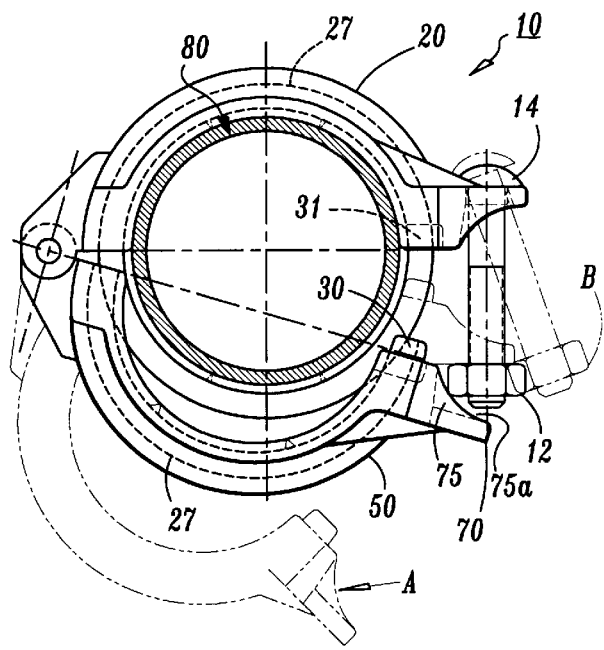
FIG. 11 is a side view of the hinged coupling of FIGS. 1–3 depicting the various positions of the coupling components during engagement.

Use of the coupling 10 will now be explained. Prior to abutting an end of a first As pipe element (not shown) to an end of a second pipe element (also not shown) such as a fitting, a valve or other device (none shown), the annular seal 80 is suggestedly slid over one end of the first pipe element. The one end of the first pipe element is abutted to one end of the second pipe element and the annular seal 80 is then slid over the abutting ends of the first and second pipe elements spanning the abutting ends of the first and second pipe elements in a conventional fashion. Referring to FIG. 11, the two segments 20, 50 are rotated apart and the first coupling segment 20 suggestedly is placed against part of the annular seal 80 such that the annular seal 80 fits into the longitudinal channel 27 as shown in solid. The second coupling segment 50 is rotated from an initial position "A" indicated in phantom inwardly towards the seal 80 and first segment 20 until the sloping surfaces 74a, 75a of the flanges 74, 75 contact the nut 12 as indicated in solid. As the second segment 50 is moved closer to the seal 80, the sloping surfaces 74a, 75a of the flanges 74, 75 guide the nut 12 outwardly until the nut 12 passes beyond the radial outer end of the bolt pad/protrusion 70. The second segment 50 is then free to move against the outside of the seal 80, which is received in the central longitudinal groove 27 of the second segment 50. At the same time, the tongue 30 of each segment 20, 50 to enter the recess 31 of the other segment The resilient annular seal 80 is thus located along an inner circumference of the coupling 10 formed by the combination of the coupling segments 20, 50. The bolt 14, which has been pitched outwardly to point "B" by the deflection of nut 12 by sloping surfaces 74a, 75a is free to pivot radially inwardly through slot 72 back to its initial position, which is indicated in solid in FIG. 11. The nut 12 is tightened down on the bolt 14 until the configuration of FIGS. 1–3 is reached. As the nut 12 and bolt 14 fastener is tightened, the pipe coupling 10 of the present invention provides a firm connection between the ends of the pipe elements being coupled. Annular seal 80, which has been located over the ends of the first and second pipe elements as previously described herein, is thus compressed into engagement with the first and second pipe elements, forming a seal with the adjacent ends of each of the first and second pipe elements.

Although segments 20 and 50 are quite similar, the differences between them that do exist in the fastener pads are sufficient to make it worthwhile economically to mold commercial numbers of the segments separately with the closed perimeter opening 46 in the first segment 20 and the open slot 72 in the second segment. 50. However, if one wanted to save money, it is possible to pivotally join together two segments 20 or two segments 50 to form two other types of pivoting couplings using identical segments. The former coupling would require the threaded end of the bolt 14 to be passed axially through the closed perimeter bore of the second segment and the nut attached after. This may be difficult to do in close quarters or stretched out on a ladder or other elevated support. In the coupling using two segments 50, there is the danger that the fastener would not be fully seated deeply in the slots and that the fastener could somehow slip from the slot after installation.

Figure 13:
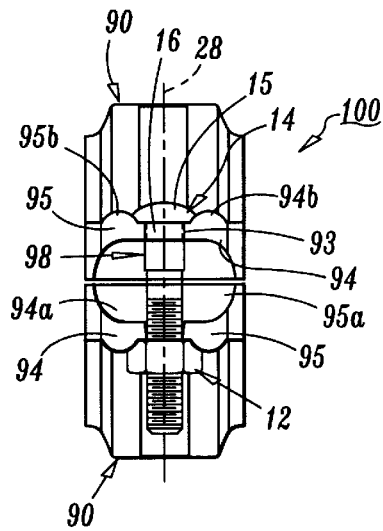
FIG. 13 is an orthogonal view from the bolted end of the coupling of FIG. 12.
Figure 12:
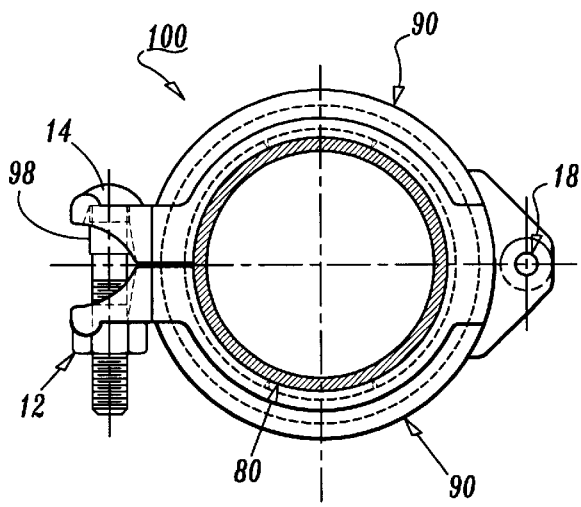
FIG. 12 is a side elevation of a second embodiment mechanical coupling with interfitting ends of the present invention.
Figure 14:
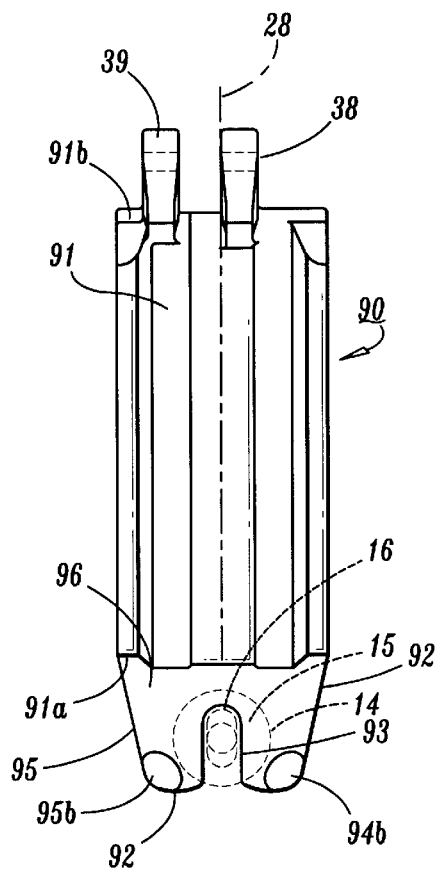
FIG. 14 is a view of the exterior of one of the two identical segments of the hinged coupling of FIG. 12, which are identical.

FIGS. 12 and 13 depict a third type of elongated, arcuate coupling segment 90 for a second embodiment hinged grooved pipe coupling 100 seen in FIGS. 13 and 14. Two identical segments 90 are used with annular seal 80 and the nut and bolt 12/14 fastener. The coupling segment 90 is identical to segment 50 except that in the protrusion 92 at the first end 91a of the elongated body 91, the central slot 93 is a little deeper and each of the pair of flanges 94, 95 adjoining and defining the slot 93 has a stop in the form of a dog 94b, 95b projecting upwardly from an otherwise substantially or essentially flat support surface 96 collectively defined by the flanges 94, 95. The dogs 94b, 95b are located so that the oval shoulder 16 of bolt 14 can be fully received in slot 93 while the dogs 94b, 95b prevent the head 15 of the bolt 14 from slipping from the surface 96. If desired, a short elastomer collar 98 can be slipped over the shaft of the bolt 14 to keep the bolt from moving up in the slot 93 and passing over the dogs 94a, 95a both while the coupling 100 is not being used and while it is being installed. Such coupling 100 would be installed like the coupling 10 except that the nut 12 (or the bolt head) would have to be slipped over the dogs 94a, 95a of one of the segments 90. Sloping surfaces 94a, 95a of the flanges guide nut 12 outwardly during installation.

It will be appreciated by those skilled in the art that changes could be made to the embodiments described above and to combinations of the embodiments without departing from the broad inventive concept thereof. For example, while the described couplings and coupling segments are configured for use with grooved pipe elements and the like, the described couplings could be used under certain circumstances with pipe elements that are smooth ended and could be modified to be used with pipe elements that have other mechanical mating structures (such as raised flanges). It is understood, therefore, that this invention is not limited to the particular embodiments disclosed, but it is intended to cover modifications within the spirit and scope of the present invention as defined by the appended claims.

I claim:

1. A coupling segment comprising:
    an elongated arcuate body having opposing first and second ends;
    a generally concave surface extending between the first end and the second end;
    a longitudinal central plane extending from the first end to the second end;
    a tongue and a recess located side-by-side at the first end, the tongue being generally on an opposite side of the longitudinal central plane from the recess, the recess being slightly larger than the tongue to receive a substantially identical tongue of another coupling segment and form a tongue-recess interfit when the coupling segment is coupled together with the other coupling segment; and
    at least a first extension of the arcuate body protruding generally radially outwardly from the second end, located on one side of the longitudinal central plane and immediately adjoining a space on an opposing side of the plane, the at least first extension having a bore extending therethrough at least substantially perpendicular to the longitudinal central plane.

2. The coupling segment of claim 1 further comprising a longitudinal channel extending along the concave surface.

3. The coupling segment of claim 2 further comprising a pair of flanges flanking the longitudinal channel and extending generally radially inwardly and axially outwardly from axial side edges of the channel.

4. The coupling segment of claim 3 further comprising a recessed shoulder on each axial side of the longitudinal channel between the channel and the flange on that axial side of the channel and at least one pipe element griping tooth extending radically and axially inwardly from the recessed shoulder.

5. The coupling segment of claim 1 further comprising a protrusion on the first end having a fastener closed perimeter hole therethrough.

6. The coupling segment of claim 1 further comprising a protrusion on the first end having a fastener slot therethrough.

7. The coupling segment of claim 6 wherein the slot defines a pair of flanges, wherein each of the flanges has a substantially flat fastener support surface adjoining the slot on one side of the protrusion facing away from the concave surface, and wherein at least one of the flanges further has at least one dog projecting from the one side of the flange adjoining the support surface so as to retain an end of the fastener on the support surface.

8. The coupling segment of claim 1 further comprising a second extension at the second end on an opposite side of the longitudinal central plane from the first extension, the second extension having a bore therethrough coaxial with the bore of the first extension and the first and second extensions defining a space between them wider than a width of the first extension along the first extension bore.

9. A segmented pipe coupling comprising a first coupling segment and a second coupling segment coupled with the first coupling segment, the first coupling segment being the coupling segment of claim 1 and the second coupling segment including:
    an elongate arcuate body having opposing first and second ends, the longitudinal central plane extending from the first end to the second end;
    a generally concave surface extending between the first end and the second end;
    a tongue and a recess located side-by-side at the first end, the tongue being generally on an opposite side of the longitudinal central plane from the recess, the recess being slightly larger than the tongue of the first coupling segment and receiving the tongue of the first coupling segment and the tongue being slightly smaller than the recess of the first coupling segment and received in the recess of the first coupling segment to form a tongue-recess interfit between the second coupling segment and the first coupling segment; and
    at least one extension of the arcuate body protruding generally radially outwardly from the second end, located on one side of the central longitudinal plane and immediately adjoining the extension on the second end of the coupling segment of claim 1, the at least one extension having a bore extending therethrough at least substantially perpendicular to the longitudinal central plane and coaxial with the bore of the coupling segment of claim 1.

10. The segmented pipe coupling of claim 9 further comprising:
    a pivot pin through the coaxial bores hingedly coupling together the second end of the second coupling segment with the second end of the first coupling segment;
    a resilient annular seal located along an inner circumference formed by the combination of the coupling segment of claim 1 the second coupling segment; and
    a mechanical fastener connecting the first end of the second coupling segment with the first end of the coupling segment of claim 1.

11. The segmented pipe coupling of claim 10 wherein the second coupling segment is identical to the first coupling segment.

12. The segmented pipe coupling of claim 10 wherein the second coupling segment differs from the first coupling segment at the first end.

13. The segmented pipe coupling of claim 10 wherein the first end of at least one of the two coupling segments has an elongated, open ended slot receiving part of the fastener.

14. The segment pipe coupling of claim 10 wherein the first end of at least one of two coupling segments has a closed perimeter hole receiving and capturing part of the fastener.

15. A hinged pipe coupling comprising a pair of coupling segments, each of the pair of coupling segments including at least:
    an elongated arcuate body having opposing first and second ends;
    a generally concave surface extending between the first end and the second end;
    a longitudinal central plane extending from the first end to the second end; and
    a tongue and a recess located side-by-side at the first end, the tongue being generally on an opposite side of the longitudinal central plane from the recess, the recess being slightly larger than the tongue to receive a substantially identical tongue of the other coupling segment and form a tongue-recess interfit when the coupling segment is coupled together with the other coupling segment;

the pair of coupling segments being pivotally coupled to one another at the second end of each segment.

16. The hinged pipe coupling of claim 15 wherein each of the pair of coupling segments further includes at least a first extension of the arcuate body protruding generally radially and axially outwardly from the second end, located on one side of the longitudinal central plane and immediately adjoining the first extension of the other coupling segment on an opposing side of the plane, each first extension having a bore extending therethrough at least substantially perpendicular to the longitudinal central plane; and the coupling further comprising a pivot pin through the bores of the first extension of each of the pair of coupling segments providing the pivotal coupling between the segments at the second ends of the segments.

17. The hinged pipe coupling of claim 15 wherein the first end of each coupling segment of the pair further includes at least a protrusion having an opening therethrough in at least a circumferential direction of the coupling; and wherein the hinged coupling further comprises a fastener through the opening of the protrusion at the first end of each of the pair of coupling segments, the fastener being selectively releasable from at least one of the pair of coupling segments to mount and dismount the pair of hinged segments.

18. The hinged pipe coupling of claim 15 further comprising an annular seal and wherein each coupling segment further includes at least a longitudinal channel extending along the concave surface of each segment arcuate body, the channel of each arcuate body receiving an arcuate portion seal within each coupling segment.

19. The hinged pipe coupling of claim 18 wherein each coupling segment further includes at least an arcuate flange extending radially and axially outwardly from each axial outer edge of the longitudinal channel.

20. The hinged pipe coupling of claim 19 wherein each coupling segment further includes at least a recessed shoulder between each axial outer edge of the longitudinal channel and the adjoining arcuate flange extending radially and axially outwardly from the axial outer edge, and a tooth in the recessed shoulder, the tooth being located and sized to grip a pipe element secured in the coupling.

21. The coupling segment of claim 1, wherein the recess has at least one pair of opposing walls.

22. The coupling segment of claim 21, wherein one pair of the opposing walls are axial end walls located to restrict axial motion of the tongue of the other coupling segment.

23. The segmented pipe coupling of claim 9, wherein the recess has at least one pair of opposing walls.

24. The segmented pipe coupling of claim 23, wherein one pair of the opposing walls are axial end walls located to restrict axial motion of the tongue received within the recess.

25. The hinged pipe coupling of claim 15, wherein the recess has at least one pair of opposing walls.

26. The hinged pipe coupling of claim 25, wherein one pair of the opposing walls are axial end walls located to restrict axial motion of the tongue received within the recess.

* * * * *